US010685375B2

(12) United States Patent
Goldman et al.

(10) Patent No.: US 10,685,375 B2
(45) Date of Patent: Jun. 16, 2020

(54) DIGITAL MEDIA ENVIRONMENT FOR ANALYSIS OF COMPONENTS OF CONTENT IN A DIGITAL MARKETING CAMPAIGN

(71) Applicant: Adobe Inc., San Jose, CA (US)

(72) Inventors: Oliver Isaac Goldman, Seattle, WA (US); Thomas William Randall Jacobs, Cupertino, CA (US); Kent Andrew Edmonds, San Jose, CA (US); Kevin Gary Smith, Lehi, UT (US); Pradeep Saikalyanachakravarthi Javangula, San Jose, CA (US); Ashley Manning Still, Atherton, CA (US)

(73) Assignee: Adobe Inc., San Jose, CA (US)

( * ) Notice: Subject to any disclaimer, the term of this patent is extended or adjusted under 35 U.S.C. 154(b) by 98 days.

(21) Appl. No.: 15/782,457

(22) Filed: Oct. 12, 2017

(65) Prior Publication Data

US 2019/0114663 A1 Apr. 18, 2019

(51) Int. Cl.
*G06Q 30/02* (2012.01)

(52) U.S. Cl.
CPC ..... *G06Q 30/0244* (2013.01); *G06Q 30/0245* (2013.01); *G06Q 30/0246* (2013.01); *G06Q 30/0276* (2013.01); *G06Q 30/0277* (2013.01)

(58) Field of Classification Search
CPC ........... G06Q 30/0244; G06Q 30/0245; G06Q 30/0246; G06Q 30/0276; G06Q 30/0277
USPC ........................................................ 705/14.43
See application file for complete search history.

(56) References Cited

U.S. PATENT DOCUMENTS

| | | | |
|---|---|---|---|
| 6,922,699 | B2 | 7/2005 | Schuetze et al. |
| 8,442,683 | B2 | 5/2013 | Lee |
| 8,752,112 | B2 | 6/2014 | Krasic et al. |
| 9,117,227 | B1 | 8/2015 | Agrawal et al. |
| 9,134,978 | B1 | 9/2015 | Roskind |

(Continued)

FOREIGN PATENT DOCUMENTS

WO WO-2015027223 2/2015

OTHER PUBLICATIONS

"Non-Final Office Action", U.S. Appl. No. 15/785,298, dated Sep. 14, 2018, 17 pages.

(Continued)

*Primary Examiner* — Colleen A Hoar
(74) *Attorney, Agent, or Firm* — SBMC

(57) ABSTRACT

Techniques and systems are described for analyzing components of digital marketing content as part of a digital marketing campaign. A computing device of an analytics system receives user interaction data that describes an effect of user interaction with a plurality of items of digital marketing content on achieving an action. The analytics system identifies which of a plurality of components are included in respective items of digital marketing content. The analytics system then generates outcome data describing a likely effect of the plurality of components on achieving the action based on association with respective items of digital marketing content. Additionally, the analytics system generates a recommendation to configure a subsequent item of digital marketing content based on the outcome data. The recommendation is based on the likely effect of the different ones of the plurality of components, to generate more effective digital marketing content items for digital marketing campaigns.

20 Claims, 8 Drawing Sheets

400 402 406 408 408 410 404 408 412 408 420 422 416 418 414 424 426 428

(56) References Cited

U.S. PATENT DOCUMENTS 9,152,624 B1 10/2015 Krallman et al.
9,367,524 B1 6/2016 Filev et al.
9,396,483 B2 7/2016 Hamedi
9,554,093 B2 1/2017 Hua et al.
9,646,227 B2 5/2017 Suri et al.
9,736,503 B1 8/2017 Bakshi et al.
9,811,590 B1 11/2017 Acharya et al.
10,339,173 B2 7/2019 Kelley et al.
10,341,199 B2 7/2019 Peri et al.
10,600,075 B2 3/2020 Fabbri et al.
2001/0035873 A1 11/2001 Easter
2002/0107926 A1 8/2002 Lee
2002/0150295 A1 10/2002 Kwok et al.
2004/0133081 A1 7/2004 Teller et al.
2005/0002586 A1 1/2005 Liege et al.
2006/0048092 A1 3/2006 Kirkley
2006/0080314 A1 4/2006 Hubert et al.
2006/0085255 A1* 4/2006 Hastings ................ G06Q 30/02 705/14.4
2007/0250901 A1 10/2007 McIntire
2008/0120646 A1 5/2008 Stern et al.
2008/0215509 A1 9/2008 Charlton
2008/0249855 A1 10/2008 Collins et al.
2009/0006467 A1 1/2009 Visscher
2009/0079871 A1 3/2009 Hua et al.
2009/0092374 A1 4/2009 Kulas
2009/0144129 A1* 6/2009 Grouf ..................... G06F 21/10 705/14.42
2010/0023393 A1 1/2010 Costy
2010/0118035 A1 5/2010 Yamakami
2010/0120402 A1 5/2010 Sethi et al.
2011/0239253 A1 9/2011 West et al.
2011/0320441 A1 12/2011 Lee et al.
2012/0116868 A1 5/2012 Chin et al.
2012/0272160 A1 10/2012 Spivack et al.
2013/0159110 A1 6/2013 Rajaram et al.
2013/0304604 A1 11/2013 Hoffman et al.
2014/0040067 A1 2/2014 England et al.
2014/0046777 A1 2/2014 Markey et al.
2014/0114746 A1 4/2014 Pani et al.
2014/0130076 A1 5/2014 Moore et al.
2014/0156379 A1 6/2014 Pani et al.
2014/0324604 A1 10/2014 Torres et al.
2014/0372901 A1 12/2014 Catlin et al.
2015/0100377 A1 4/2015 Penumaka et al.
2015/0161648 A1* 6/2015 Heath ................ G06Q 30/0201 705/14.36
2015/0324867 A1 11/2015 Jalili
2016/0078520 A1 3/2016 Nice et al.
2016/0086215 A1 3/2016 Wang et al.
2016/0286244 A1 9/2016 Chang et al.
2016/0300135 A1 10/2016 Moudy et al.
2016/0335339 A1 11/2016 Venkataraman et al.
2017/0061500 A1 3/2017 Borodin
2017/0078350 A1 3/2017 Gordon
2017/0099525 A1 4/2017 Ray et al.
2017/0140283 A1 5/2017 Cheng et al.
2017/0161773 A1 6/2017 Xu et al.
2017/0337234 A1 11/2017 Goldman et al.
2018/0012253 A1 1/2018 Gavlovski et al.
2018/0040019 A1 2/2018 Gavlovski et al.
2018/0040029 A1 2/2018 Zeng et al.
2018/0101611 A1 4/2018 McDevitt et al.
2018/0109612 A1 4/2018 Zhong et al.
2018/0189822 A1 7/2018 Kulkarni et al.
2018/0240152 A1 8/2018 Mookherjee et al.
2019/0034809 A1 1/2019 Xu et al.
2019/0080019 A1 3/2019 Young et al.
2019/0095945 A1 3/2019 Fabbri et al.
2019/0095949 A1 3/2019 Chien et al.
2019/0108250 A1 4/2019 Miller et al.
2019/0108288 A1 4/2019 Miller et al.
2019/0114151 A1 4/2019 Jacobs et al.
2019/0114664 A1 4/2019 Goldman et al.
2019/0114672 A1 4/2019 Jacobs et al.
2019/0114680 A1 4/2019 Chien et al.
2019/0130356 A1 5/2019 Balakrishnan et al.
2019/0130458 A1 5/2019 Balakrishnan et al.
2019/0164082 A1 5/2019 Wu

OTHER PUBLICATIONS

“Restriction Requirement”, U.S. Appl. No. 15/785,298, dated Jul. 19, 2018, 7 pages.
“Final Office Action”, U.S. Appl. No. 15/785,298, dated Apr. 17, 2019, 24 pages.
Forrest,“How Google wants to crowdsource machine learning with smartphones and Federated Learning”, Retrieved at: https://www.techrepublic.com/article/how-google-wants-to-crowdsource-machine-learning-with-smartphones-and-federated-learning/, Apr. 7, 2017, 10 pages.
McMahan,“Communication-Efficient Learning of Deep Networks from Decentralized Data”, Proceedings of the 20 the International Conference on Artificial Intelligence and Statistics (AISTATS) 2017. JMLR: W&CP vol. 54, Feb. 28, 2017, 11 pages.
“Pre-Interview First Office Action”, U.S. Appl. No. 15/785,298, dated Sep. 21, 2018, 4 pages.
“First Action Interview Office Action”, U.S. Appl. No. 15/785,298, dated Oct. 1, 2018, 4 pages.
“Pre-Interview First Office Action”, U.S. Appl. No. 15/716,348, dated Jan. 29, 2019, 3 pages.
“First Action Interview Office Action”, U.S. Appl. No. 15/716,348, dated Feb. 20, 2019, 3 pages.
“Pre-Interview First Office Action”, U.S. Appl. No. 15/726,168, dated Mar. 19, 2019, 7 pages.
“Final Office Action”, U.S. Appl. No. 15/716,348, dated Jul. 23, 2019, 25 pages.
“Final Office Action”, U.S. Appl. No. 15/726,125, dated Sep. 13, 2019, 11 pages.
“First Action Interview Office Action”, U.S. Appl. No. 15/726,168, dated Jun. 28, 2019, 6 pages.
“First Action Interview Office Action”, U.S. Appl. No. 15/783,228, dated Aug. 22, 2019, 8 pages.
“Pre-Interview First Office Action”, U.S. Appl. No. 15/726,125, dated Jul. 11, 2109, 7 pages.
“Pre-Interview First Office Action”, U.S. Appl. No. 15/783,228, dated Jul. 8, 2019, 8 pages.
“Restriction Requirement”, U.S. Appl. No. 15/782,517, dated Jul. 11, 2019, 7 pages.
Foley,“How to Get WordPress Rotating Header Images”, Apr. 19, 2013, 14 pages.
“Final Office Action”, U.S. Appl. No. 15/726,168, dated Dec. 11, 2019, 11 pages.
“Non-Final Office Action”, U.S. Appl. No. 15/782,517, dated Dec. 12, 2019, 30 pages.
“Non-Final Office Action”, U.S. Appl. No. 15/785,298, dated Dec. 9, 2019, 11 pages.
“Non-Final Office Action”, U.S. Appl. No. 15/801,173, dated Oct. 30, 2019, 22 pages.
“Notice of Allowance”, U.S. Appl. No. 15/713,339, dated Nov. 25, 2019, 13 pages.
“Notice of Allowance”, U.S. Appl. No. 15/726,125, dated Jan. 8, 2020, 8 pages.
“Pre-Interview First Office Action”, U.S. Appl. No. 15/801,173, dated Dec. 2, 2019, 4 pages.
“Final Office Action”, U.S. Appl. No. 15/783,228, dated Oct. 24, 2019, 23 pages.
“Pre-Interview First Office Action”, U.S. Appl. No. 15/713,339, dated Aug. 8, 2019, 3 pages.
“Corrected Notice of Allowability”, U.S. Appl. No. 15/726,125, dated Mar. 18, 2020, 2 pages.
“Corrected Notice of Allowability”, U.S. Appl. No. 15/726,125, dated Apr. 24, 2020, 2 pages.
“First Action Interview Office Action”, U.S. Appl. No. 15/801,090, dated Apr. 14, 2020, 4 pages.
“Global Unique Identifier”, Tech Terms, Retrieved at: https://techterms.com/definition/guid, Oct. 13, 2008, 1 page.

(56) References Cited

OTHER PUBLICATIONS

"Non-Final Office Action", U.S. Appl. No. 15/716,348, dated Mar. 25, 2020, 26 pages.
"Non-Final Office Action", U.S. Appl. No. 15/783,228, dated Apr. 17, 2020, 30 pages.
"Non-Final Office Action", U.S. Appl. No. 15/801,090, dated Mar. 10, 2020, 26 pages.
"Non-Final Office Action", U.S. Appl. No. 15/801,173, dated Mar. 31, 2020, 26 pages.
"Notice of Allowance", U.S. Appl. No. 15/726,168, dated Mar. 26, 2020, 9 pages.
"Pre-Interview First Office Action", U.S. Appl. No. 15/801,090, dated Mar. 16, 2020, 5 pages.

* cited by examiner

DIGITAL MEDIA ENVIRONMENT FOR ANALYSIS OF COMPONENTS OF CONTENT IN A DIGITAL MARKETING CAMPAIGN

BACKGROUND

Analytics systems have been developed to collect and analyze large sets of data to identify trends, patterns, and correlations in the data that are not readily observable by humans due to the amount of data. In one example of analysis performed by an analytics system, a variety of additional insights are gained into operation of a service provider system within a digital medium environment, such as a web service, online provider of goods and services, and so forth. In a digital marketing scenario, for instance, this may be used to identify segments (e.g., subsets) of a user population in order to target digital marketing content to increase a likelihood of conversion. Other examples include insights into computational resource consumption by the service provider system, tracking of expenses and revenue, number of visitors to a web service, page views, and so forth.

Conventional analytics systems support a variety of techniques by which a user may interact with the data in order to gain access to this insight provided by the analytics system, such as to evaluate values of different metrics described in the analytics data via a user interface. A user, for instance, may interact with the user interface of the analytics system to view different combinations of metrics that have been associated by the system, values of those metrics, trends exhibited by the values of those metrics and correlated metrics, and so on. However, conventional analytics systems do not account for effects of individual components of digital marketing content within the analytics data. Consequently, conventional analytics systems provide a limited ability, if at all, to gain insight into how different individual components of an item of digital marketing content can affect the values of these metrics.

SUMMARY

Techniques and systems are described to enable users to optimize a digital marketing content system by analyzing components of digital marketing content. For example, a computing device of an analytics system receives user interaction data that describes an effect of user interaction with a plurality of items of digital marketing content on achieving an action. A digital marketing content item is made up of a plurality of components that such as text, photographs, vector artwork, digital images, 3-dimensional (3D) objects, haptic output, audio, and/or video, which in turn may include attributes such as color, size, location in the content item, duration of display, content creator, actions, activities, and so forth. The analytics system identifies which of a plurality of components are included in respective items of digital marketing content.

The analytics system then generates outcome data describing a likely effect of the plurality of components on achieving the action based on association with respective items of digital marketing content. For example, the analytics system determines whether different ones of the plurality of components caused the digital marketing content item to be successful, unsuccessful, or had no effect on achieving the action. Additionally, the analytics system generates a recommendation to configure a subsequent item of digital marketing content based on the outcome data. The recommendation is based on the likely effect of the different ones of the plurality of components, in order to generate more effective digital marketing content items for digital marketing campaigns.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
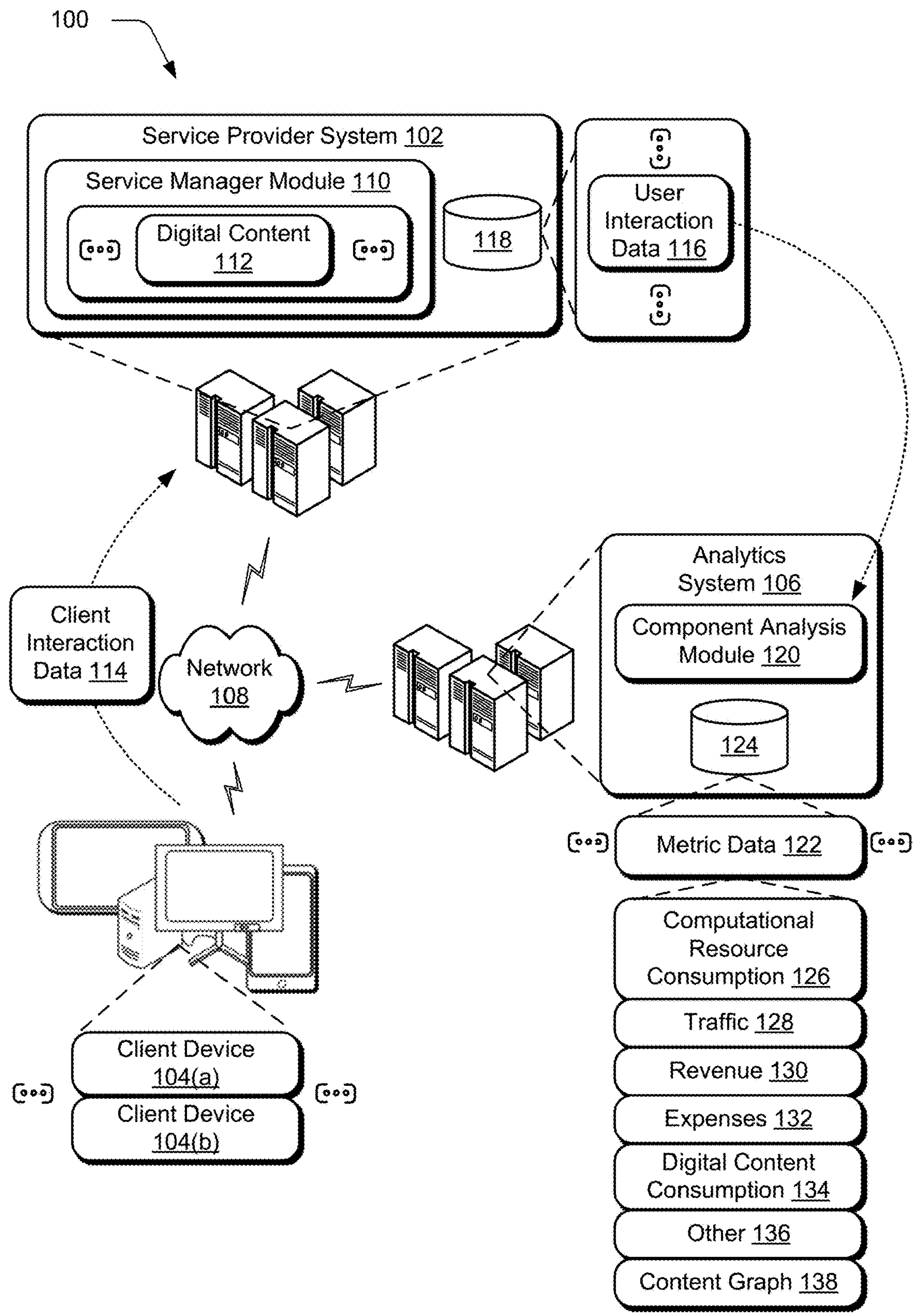
FIG. 1 is an illustration of an environment in an example implementation that is operable to employ techniques for analysis of components of digital marketing content as described herein.

Analytics systems may be used to give a variety of insights in to operation of a service provider system based on correlations, trends, and patterns exhibited by data collected from the service provider system. Conventional analytics systems, however, provide very limited insight on how individual components of an item of digital content affect an outcome of an action relating to the digital content. For example, a conventional analytics system may obtain data describing conversion of digital marketing content. In one example, viewers of a digital marketing content item such as a banner advertisement may be more likely to click on the advertisement when the advertisement contains a component item of a forest scene as opposed to a component item of a cityscape. However, conventional analytics systems have no way of differentiating between the success of the banner advertisement occurring because of the differences in these components.

Thus, conventional analytics systems are not able to address "what" component is included in the digital marketing content but rather merely rely on identification of the digital marketing content as a whole. As a result, conventional analytics systems are limited to identification of a particular item of digital marketing content (e.g., a banner advertisement) and not able to address components of the digital marketing content, such as a color scheme used in the banner advertisement, size or location of objects in the banner advertisement, and so forth. Because conventional techniques do not take individual components of digital marketing content into account, conventional analytics systems provide an inaccurate and incomplete analyses of metrics of the digital marketing content.

Accordingly, techniques and systems are described for analyzing components of digital marketing content in a digital media environment. The techniques and systems determine effects of individual components of a digital marketing content item for metrics involving provision of digital content by a service provider system. The service provider system, for instance, may be configured to provide digital content as an online application (e.g., for subscription based access), provide opportunities to purchase a good or service, online storage, or other web service that is accessible via a network.

Operation of the service provider system in providing this access to the digital content may be described in usage data using a variety of metrics and values of those metrics. Metrics include any characteristic that may be described in the operation of the service provider system to provide the digital content for access via the network. Examples of metrics include computational resource consumption (e.g., storage, network, or processing), traffic (e.g., a number of visitors, page views), revenue, expenses, conversion rate, and so forth.

To begin, a computing device of an analytics system receives user interaction data that describes an effect of user interaction with a plurality of items of digital marketing content on achieving an action. A digital marketing content item of the plurality of digital marketing content items may be any form of digital content used in a digital marketing campaign, such as commercials during a television or radio program; printed advertisements appearing in newspapers or magazines; support media delivered through billboards, transits, bus benches, directories, and so forth; direct marketing through mail, telemarketing, and email; product placement in a television show, movie, or theme park; or internet promotion via banner advertisements, pop-up advertisements, text advertisements, virtual reality advertisements, and paid search placements. Each digital marketing content item is made up of a plurality of components that may include text, photographs, vector artwork, digital images, 3D objects, haptic output, audio, and/or video, which in turn may include attributes such as color, size, location in the content item, duration of display, content creator, actions, activities, and so forth.

Interaction with the digital marketing content items can take a variety of forms, such as converting a good or service as a result of consuming a digital marketing content item, clicking on a banner advertisement or email link to the seller's website, calling a phone number listed on a television or radio advertisement for additional information about the good or service, and so on. The user interaction data indicates whether the digital marketing content item was successful, unsuccessful, or had no effect on achieving the action as part of the digital marketing campaign.

Next, the analytics system identifies which of a plurality of components are included in respective ones of the plurality of items of digital marketing content. Identifying components, and attributes of components, can include analyzing metadata or HTML associated with a particular digital marketing content item, object recognition within the digital marketing content item, sound recognition for the digital marketing content item, and so forth. The analytics system identifies components or attributes of components that are the same, or similar, between multiple items of digital marketing content to better understand which components and attributes have a successful or unsuccessful effect on achieving the action.

The analytics system generates outcome data describing a likely effect of the plurality of components on achieving the action based on association with respective ones of the plurality of items of digital marketing content. For example, the analytics system compares the user interaction data for one of the components to user interaction data for a component in a different digital marketing content item that has the same or similar characteristics. If both components that have the same or similar characteristics appearing in two different digital marketing content items had similar outcomes (e.g., both were successful or unsuccessful at achieving the action), then the analytics system determines that both components had a corresponding effect on achieving the action. The analytics system may also take considerations for different audience segments, temporal factors, delivery methods, and so forth when determining the effect of the components on the outcomes of the digital marketing content items. The analytics system then outputs the outcome data in a user interface, such as by making a recommendation to configure a subsequent item of digital marketing content based on the outcome data.

By generating and analyzing data for individual components of a digital marketing content item, the analytics system gives marketing teams the ability to determine success of the digital marketing content item on a piece-by-piece basis. Having access to this information gives marketing teams an opportunity to deliver the right content to the right audience, at the right time, and through the right channels. In this way, resources are allocated more efficiently during a marketing campaign, as content items can be targeted towards a specific audience based on outcome data for components of a content item, rather than guessing how that audience might respond.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital marketing content component analysis techniques described herein. The illustrated environment 100 includes a service provider system 102, client devices 104(*a*) and 104(*b*), and an analytics system 106 that are communicatively coupled, one to another, via a network 108. Computing devices that implement the service provider system 102, the client devices 104(*a*) and 104(*b*), and the analytics system 106 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider and analytics systems 102, 106 and as further described in FIG. 8.

The service provider system 102 is illustrated as including a service manager module 110 that is implemented at least partially in hardware of a computing device. The service manager module 110 is configured to manage online interaction of the client devices 104(*a*) and 104(*b*) with digital content 112 of the service provider system 102 via the network 108. As previously described, the digital content 112 may take a variety of forms, such as an online application, online storage, web service, digital images, digital audio, multimedia, and so forth. Thus, client interaction data 114 communicated via the network 108 involving interaction with the digital content 112 by the client devices 104(*a*) and 104(*b*) via the network 108 may also take a variety of forms, such as selection of a menu item, voice command, gesture, selection of a hyperlink, and so forth.

A user of client device 104(*a*), for instance, may create the digital content 112 by accessing the service manager module 110 via the network 108, such as to create an illustration, movie, audio data, and so forth. This may include execution of applications locally by the client device 104(*a*) and remotely by the service provider system 102 that both involve actions taken with respect to the digital content 112. As part of this, a user of the client device 104(*a*) may initiate operations involving interaction with the digital content 112, such as to draw a line, color a shape, enter text, and so forth. Thus, initiation of these operations is considered performance of an action involving interaction with the digital content 112. Other examples are also contemplated in which the digital content 112 is an application, web service, and so forth and thus different interactions with the digital content 112 (e.g., a user interface of the digital content 112) also correspond to different actions, e.g., selection of a link, an item in a user interface, and so forth.

The service manager module 110 is configured to generate user interaction data 116, illustrated as stored in storage 118, that describes provision of the digital content 112 that supports this interaction. The user interaction data 116, for instance, may describe interactions of the client device 104(*b*) with the digital content 112. This may be reflected as a number of visitors, page views, conversions, and so forth. The user interaction data 116 may also describe operation of the service provider system 102 performed in the provision of the digital content 112, such as hardware resources (e.g., processing system, computer-readable storage media, network), software resources, revenue collected, expenses occurred, and so forth.

The user interaction data 116 is this example is then collected by the analytics system 106 via the network 108. The analytics system 106 includes a component analysis module 120 that is implemented at least partially in hardware of a computing device (e.g., a processing system and computer readable storage medium) to generate metric data 122 from the user interaction data 116, which is illustrated as stored in storage 124. The metric data 122 is configured to analyze individual components of digital marketing content items for metrics involving provision of the digital content 112 by the service provider system 102.

The metric data 122, for instance, may be configured to analyze components of a digital marketing content item using values of computational resource consumption 126 by the service provider system 102. Computational resource consumption 126 may include an amount of processing (e.g., servers, cores, CPUs), memory (e.g., RAM, persistent storage), network (e.g., bandwidth, spikes) resources used by the service provider system 102. In another example, the metric data 122 includes traffic 128 to the service provider system 102, such as number of visitors, page views, and so on. The metric data 122 may also take into account financial considerations of the service provider system 102 in providing the digital content 112, such as revenue 130 and expenses 132. In another example, the metric data 122 includes digital content consumption 134, such as number of downloads, interactions, which items of digital content 112 are viewed (e.g., videos, web pages), how this interaction occurs (e.g., stream, download, browser, mobile application), and so forth.

Other 136 examples of metrics that may be analyzed for components of digital marketing content items by the component analysis module 120 involving provision of the digital content 112 by the service provider system 102 are also contemplated, including metrics describing users and user devices that interact with the digital content 112, such as demographics, product descriptions, and so forth. In implementations, the metric data 122 can also include a content graph 138, including information on various aspects related to a digital marketing campaign. The content graph 138 may include information specific to an item of digital content 112, including both intrinsic attributes of components of the item of digital content (e.g., size, color, objects, digital images, 3D objects, haptic output, video, etc.) and attached attributes of components of the item of digital content (e.g., author, producer, sound editor, audience members who performed an action on the item of digital content, etc.). The component analysis module 120 may generate and utilize this metric data 122 in a variety of ways, an example of which is described in greater detail in the following discussion and is shown in a corresponding figure.

Figure 2:
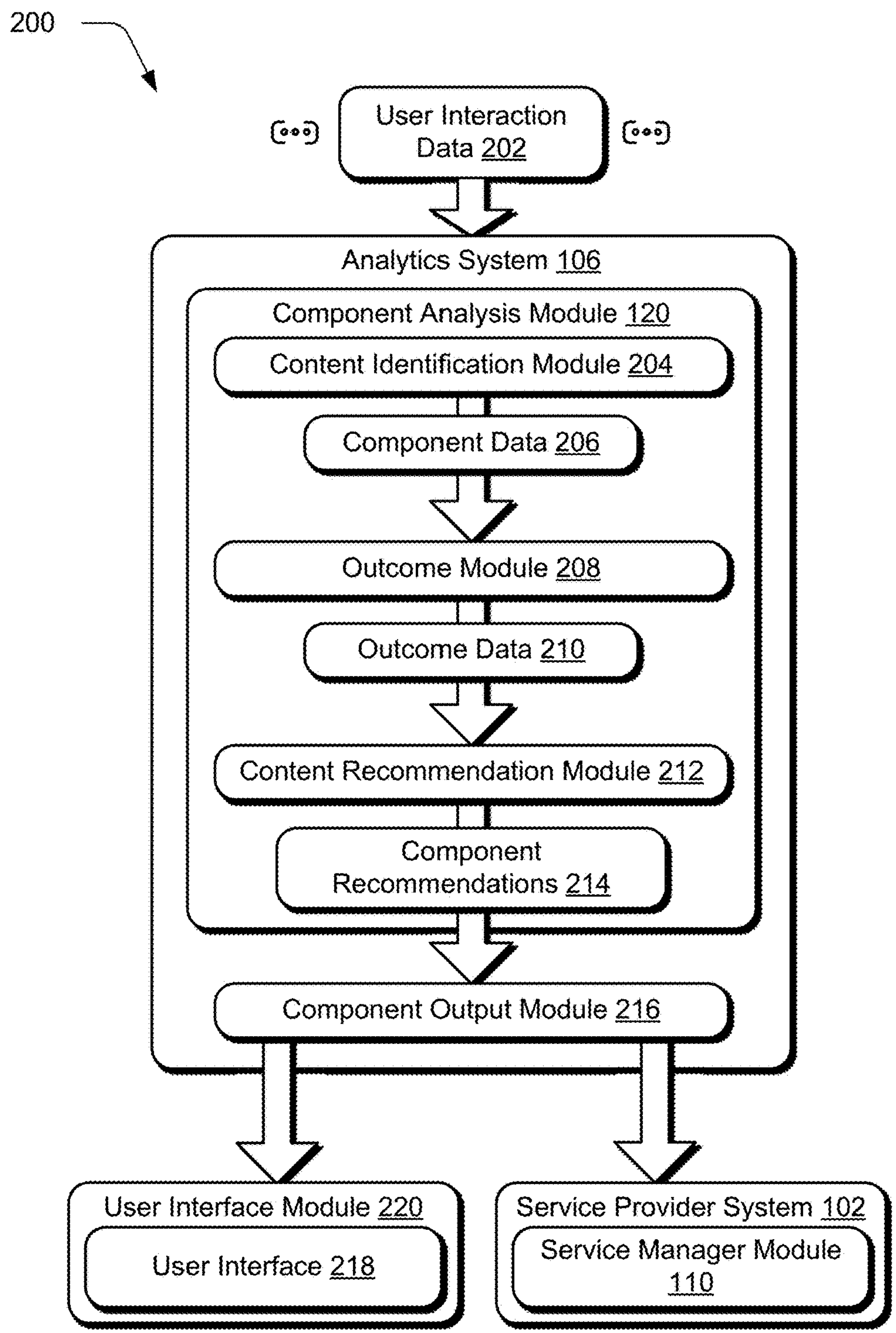
FIG. 2 depicts a system in an example implementation showing operation of a component analysis module of FIG. 1 in greater detail.

FIG. 2 depicts a system 200 in an example implementation showing operation of the component analysis module 120 of FIG. 1 in greater detail. To begin in this example, user interaction data 202 is received by a content identification module 204 of the component analysis module 120. The user interaction data 202 describes an effect of user interaction with a plurality of items of digital marketing content of the digital content 112 on achieving an action. The user interaction is generally dependent on the type of digital marketing content item, and describes how users responded to presentation of the digital marketing content item such as by clicking on the digital marketing content item, following a link, navigating to different pages of a website, and so forth. The user interaction with the digital marketing content items consequently affects whether an action, such as converting (e.g., purchasing, viewing, downloading, etc.) on a good or service is achieved. For example, a user may navigate through several pages of a website (e.g., user interaction) before purchasing a product sold on the website (e.g., achieving an action). In this example, the number of pages navigated on the website can be indicative of the effect on achieving the final action of purchasing the product from the website.

A user of the analytics system 106, for instance, may interact with a user interface of the analytics system 106 as part of the receipt of the user interaction data 202. The user interface is configured to support a flexible reporting and analytics work space in which a user may interact with usage data 116 that describes values of metrics involving provision of the digital content 112 by the service provider system 102. The user interface, for instance, may be configured to output correlations, trends, and patterns exhibited by values of metrics of the usage data 116, which may be learned automatically and without user intervention by the analytics system 106 or based on manual inputs from a user, at least in part.

The content identification module 204 identifies which of a plurality of components are included in respective ones of the plurality of items of digital marketing content. As discussed above, the digital marketing content items may be any form of digital content used in a digital marketing campaign, such as commercials during a television or radio program; printed advertisements appearing in newspapers or magazines; support media delivered through billboards, transits, bus benches, directories, and so forth; direct marketing through mail, telemarketing, and email; product placement in a television show, movie, or theme park; or internet promotion via banner advertisements, pop-up advertisements, text advertisements, virtual reality advertisements, and paid search placements. Each of the digital marketing content items are made up of a plurality of components that may include text, photographs, vector artwork, digital images, 3D objects, haptic output, audio, and/or video, which in turn may include attributes such as color, size, location in the content item, duration of display, content creator, actions, activities, and so forth.

The content identification module 204 can identify the plurality of components, and attributes of the components, using a variety of techniques. For instance, the content identification module 204 can access metadata, HTML, or other information associated with a digital marketing content item for information on components or attributes of components. If a particular digital marketing content item is a digital image, vector artwork, or a video, the content identification module 204 may use object recognition techniques to identify the plurality of components, such as CAD-like object models; appearance-based methods such as edge matching, divide-and-conquer search, and gradient or grayscale matching; feature-based methods such as interpretation trees, hypothesize-and-test techniques, pose consistency, pose clustering, or geometric hashing; genetic algorithms, and so forth. If the digital marketing content item contains audio content, the content identification module 204 may use speech or music recognition to identify the plurality of components. The content identification module 204 may use both object recognition techniques and sound recognition techniques for a single digital marketing content item to identify both visual components and auditory components of the digital marketing content item. The content identification module 204 may also identify components or attributes of the digital marketing content item from a content graph associated with the digital marketing content item, which is discussed in detail with regards to FIG. 4.

The content identification module 204 generates component data 206 based on the plurality of identified components of the digital marketing content items. The component data 206 includes attributes of the plurality of identified components of the digital marketing content items, such as content type, size, location in the digital marketing content item, location in relationship to other components, duration, color, and so forth. The attributes included in the component data 206 describe features or properties of the digital marketing content items. For example, a digital marketing content item such as a banner advertisement may include a digital image of a shoe, which is identified as a component of the banner advertisement. The shoe, then, may have attributes such as color, size, an effect applied to the digital image of the shoe, and so on. The component data 206 may be incorporated into a content graph that connects users, content, and attributes, as discussed in more detail below.

Figure 3:
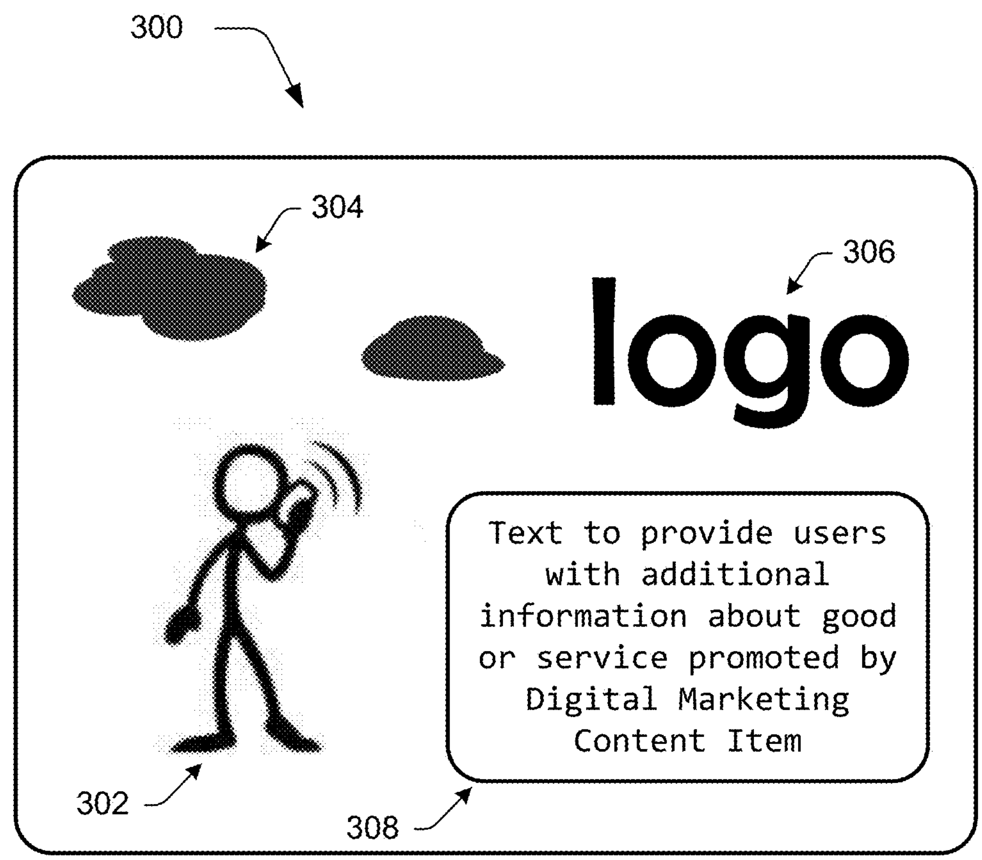
FIG. 3 depicts an example implementation showing a digital marketing content item having a plurality of components which may be analyzed using the techniques and systems described herein.

For example, consider FIG. 3, which depicts an example implementation showing a digital marketing content item 300 having a plurality of components. The components include a first digital image 302 of a user, a second digital image 304 of weather, a vector artwork 306 of a logo, and a text box 308. Each of these components of the digital marketing content item 300 may have their own respective attributes. For instance, the components 302, 304, 306, and 308 in the digital marketing content item 300 each have intrinsic attributes such as size, color, and location within the digital marketing content item. Some of the intrinsic attributes of the individual components 302, 304, 306, and 308 may be specific to the respective individual components, and do not pertain to other components in the digital marketing content item 300. For example, the vector artwork 306 may have intrinsic attributes such as stroke color, shape, curve, thickness, and fill, while the text box 308 has intrinsic attributes such as font, effects, spacing, alignment, and so forth.

The intrinsic attributes of the components described in FIG. 3 are inherent to the components themselves. Intrinsic attributes of the components can be determinable by the content identification module 204, even if information pertaining to the intrinsic attributes are not included in metadata or otherwise with the digital marketing content item 300. For example, the content identification module 204 can determine a color in the digital image 304 or a font in the text box 308 using tools in applications such as Adobe Photoshop™ In another example, the content identification module 204 determines objects and activities taking place in a video of a digital marketing content item. Activities in a video are actions taking place on or by the objects in the video, such as "riding" a bike "through" a forest, a person "drinking" a beverage, "sitting" in a comfortable chair, "waving" goodbye, the sun "setting," and so forth. Activities in a video may also have an effect on a particular outcome of a digital content item, and thus are identified by the content identification module 204 and further analyzed by the analytics system 106 as discussed below.

Additionally, users of the analytics system 106 may want to know information such as who created the particular vector artwork 306 in the digital marketing content item 300, so that the creator may be commissioned for another digital marketing campaign. This information is included in attached attributes of a component in a digital marketing content item. Attached attributes are attributes that associate a user or application to a digital marketing content item or component in the digital marketing content item, such as author, producer, sound editor, audience members who performed an action on the item of digital content, and so forth. Additionally, attached attributes can include underlying features that describe components of the items of digital marketing content, such as what is included in individual layers of a drawing, different sources or content creators of individual layers of a drawing, and so on that can be extracted from an Adobe Photoshop™ Document (PSD) or Adobe Illustrator™ file, for instance. Generally, layers of a drawing are used to separate different elements of a digital image, and can be used to apply or place imaging effects or additional digital images over or under the digital image. Layers may exist as pixels or as modification instructions, for example, and can be stacked on top of each other, depending on the order, to determine an overall appearance of the digital image. Conventional systems often lose track of attached attributes, such as when the digital marketing content item is saved by another user (thus erasing the original creator of the digital content item) or transferred in file management operations, to name a few examples. Therefore, conventional systems leave users without information regarding who or what created various components of a digital marketing content item, and whether the creators were successful or unsuccessful at producing a particular outcome.

Figure 4:
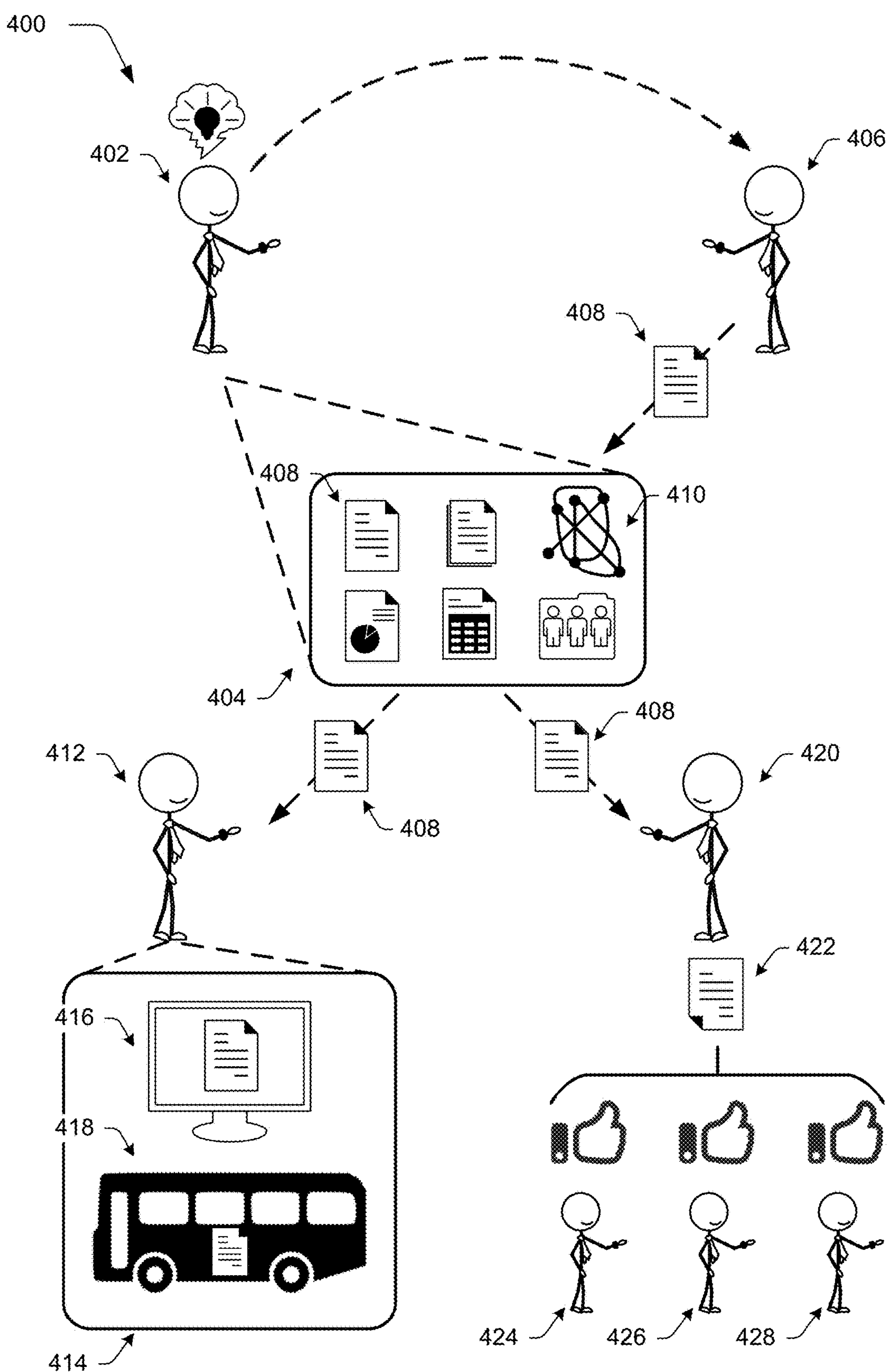
FIG. 4 depicts a system in an example implementation showing operation of an analytics system including associating attachable attributes to components of a digital marketing content item.

To account for the drawbacks of conventional systems that lose track of attached attributes, consider FIG. 4, which depicts an environment 400 including operation of an analytics system configured to associate attachable attributes to components of a digital marketing content item. To begin, a project manager 402 has an idea to generate brand awareness as part of a digital marketing campaign 404 for a product produced by the project manager's company. The project manager 402 commissions a content creator 406 to generate a digital marketing content item 408 for the project manager's digital marketing campaign.

When the content creator 406 creates the digital marketing content item 408, the analytics system generates a content graph 410, which associates both attached and intrinsic attributes to the digital marketing content item. The content graph 410 can be stored as part of the digital marketing campaign 404, so that users with access to the digital marketing campaign can access the digital marketing content item 408 along with relevant attached and intrinsic attributes if desired. At this stage, the content graph 410 includes attached attributes such as the project manager 402 who commissioned the digital marketing content item 408, the content creator 406, and can also include information on other items of digital marketing content in the digital marketing campaign and how the other items are related to the digital marketing content item 408.

After the digital marketing item 408 is created, users with access to the digital marketing campaign 404 may wish to use the digital marketing content item in different scenarios. For instance, a marketer 412 uses the digital marketing content item 408 as part of a sub-campaign 414 to advertise the product, such as in an online channel 416 and displayed in a public transportation channel 418. The content graph 410 incorporates attached attributes indicating the marketer 412 who used the digital marketing content item 408, the sub-campaign 414 that the digital marketing content item was used in, and the channels 416 and 418 that were used to deliver the digital marketing content item to its audience. The content graph 410 includes information on what version of the digital marketing content item 408 is used and when in the sub-campaign 414, so that analytics systems and future users know the exact digital marketing content item that produced particular outcomes and metrics related to those outcomes.

Additionally, another content creator 420 may use the digital marketing content item 408 as a basis to create a modified digital marketing content item 422. The modified digital marketing content item 422 is incorporated into the content graph 410, with an indication of how the two digital marketing content items 408 and 422 are related to one another. Further, information on the other content creator 420 is included in the content graph 410 to record who made the changes to the digital marketing content item 408. Information on the other content creator 420 and how the other content creator changed the digital marketing content item 408 to create the modified digital marketing content item 422 provide insight on whether the original content or the modified content was more successful at producing particular outcomes and metrics related to those outcomes.

For example, the modified digital marketing content item 422 is displayed on a social media platform, where users 424, 426, and 428 all "like" the modified digital content item. A record of these "likes", along with information about the users 424, 426, and 428, are incorporated into the content graph 410. The information about the users 424, 426, and 428 may be used by the analytics system to generate outcome data for metrics regarding types of users that responded positively to the modified digital marketing content item 422. Data on the users 424, 426, and 428 responses to the modified digital marketing content item 422 can then be compared with data on responses or outcomes of other users to the digital marketing content item 408. Comparison of the two digital marketing content items 408 and 422 can be used to determine a likely effect of different components of the two digital marketing content items, such as which audience segments had a more positive or negative experience with the two digital marketing content items, which channels of delivery of the two digital marketing content items had the greatest effect on outcomes of the digital marketing content items across audience segments, and so forth.

Consequently, both intrinsic attributes (e.g., described in relation to FIG. 3) and attached attributes (e.g., described in relation to FIG. 4) can be included in a content graph that connects users, content, and attributes to one another. Connections in a content graph can be analyzed to understand what aspects of a digital marketing content item produced particular outcomes and additional metrics related to those outcomes as described above and below. In particular, both intrinsic and attached attributes can be included in a content graph for individual components of a digital marketing content item, which can provide valuable insight to project managers, content creators, marketers, data analysts, or any other users involved with a digital marketing campaign.

Additionally, the content graph 410 includes relationships of content, attributes, and users across multiple digital marketing campaigns. For example, a font attribute may result in a successful outcome in a particular audience segment regardless of the digital marketing campaign in which the font is used. In another example, a color scheme may result in a successful outcome at a particular time of year, regardless of the digital marketing campaign in which the color scheme is used. In yet another example, a photographer (e.g., included as an attached attribute) may result in a successful outcome for a particular category of product, even if individual products in the category have independent digital marketing campaigns. By including relationships of content, attributes, and users across multiple digital marketing campaigns in the content graph 410, the content graph can be used to capture variation both within a campaign and across campaigns, and consequently provide more accurate and useful recommendations.

Returning to a discussion of FIG. 2, an outcome module 208 generates outcome data 210 describing a likely effect of the plurality of components on achieving the action based on association with respective items of digital marketing content. To do so, the outcome module 208 compares the user interaction data 202 between the multiple items of digital marketing content. For example, the outcome module 208 compares the user interaction data 202 for one of the components to user interaction data for a component in a different digital marketing content item that has the same or similar characteristics. If both components that have the same or similar characteristics appearing in two different digital marketing content items had similar outcomes (e.g., both were successful or unsuccessful at achieving the action), then the outcome module 208 determines that both components had a corresponding effect on achieving the action.

In another example, the outcome module 208 identifies a same or similar component or attribute that had similar outcomes in different digital marketing campaigns. As an illustration, a digital image of a smiling baby used to sell both baby products and life insurance may be successful in both digital marketing campaigns, even though the two digital marketing campaigns are otherwise unrelated to one another. The outcome module 208 can include information on the particular digital marketing campaigns in the outcome data 210 indicating that the component had a corresponding effect on achieving the action.

The outcome data 210 represents whether components and/or attributes the digital marketing content items were successful, unsuccessful, or had no effect on achieving the action as part of the digital marketing campaign. The outcome module 208, for instance, may take considerations for different audience segments, temporal factors, delivery methods, and so forth when determining the effect of the components on achieving the action. Further, the outcome data 210 may contain various different indications on whether the digital marketing content items were successful or unsuccessful at achieving an action based on their association with respective items of digital marketing content items.

For example, the outcome module 208 can determine that a particular component shared between five different digital marketing content items likely caused users to view the digital marketing content items longer than other digital marketing content items, especially where the particular component was the only shared property between the five digital marketing content items. The outcome data 210 may further indicate that the digital marketing content items containing the same or similar component successfully achieved the action of being clicked on as part of an email campaign, but were unsuccessful at being clicked on as a banner advertisement. In this example, the outcome module 208 can determine that the channel of delivery via email for digital marketing content items sharing a particular component were more effective than channel of delivery via the banner advertisement. In another example, the outcome data 210 may indicate that the digital marketing content items sharing a same or similar component successfully achieved the action for conversion amongst a first audience segment, but did not successfully achieve the action for conversion amongst a second audience segment. In this example, the outcome module 208 determines that the component shared between the digital marketing content items was more effective at achieving the action in the first audience segment than in the second audience segment.

The outcome module 208 can also assign the outcome data 210 to the components of the digital marketing content items. In one example, the outcome module 208 assigns the outcome data 210 for a digital marketing content item to each of the components in the digital marketing content item. Assigning the outcome data 210 to each of the components may assist users or the analytics system 106 in determining which of the components included in the digital marketing content item was most effective at achieving an action.

Alternatively or additionally, the outcome module 208 assigns the outcome data 210 for a digital marketing content item to a subset of the components in the digital marketing content item. In an example, the outcome module 208 assigns the outcome data 210 to a video producer (e.g., an attached attribute) of a video in the digital marketing content item. In this way, the analytics system 106 determines how the video producer compares to other video producers based on a number of actions achieved by the digital marketing content item. Such information may be used when selecting a video producer for future digital marketing campaigns, without distractions of undesired data.

Different components of the same digital marketing content item may have different effects on the success of the digital marketing content item in achieving an action, and on different metrics associated with the outcome of the digital marketing content item. Also, both intrinsic and attached attributes of individual components may have an effect on achieving an action. The outcome module 208 determines effects of both individual components, and individual attributes of components, on the likely effect of the components and/or attributes on achieving the action.

Figure 5:
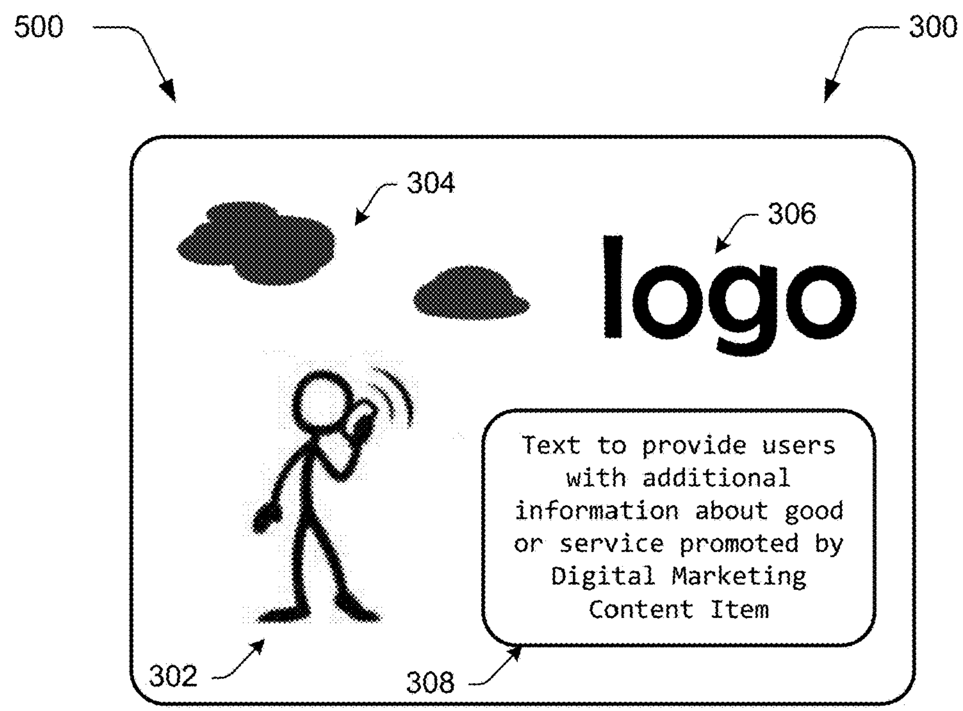
FIG. 5 depicts an example implementation showing effects of different components on an outcome of the digital marketing content item of FIG. 3 in greater detail.
Figure 5:
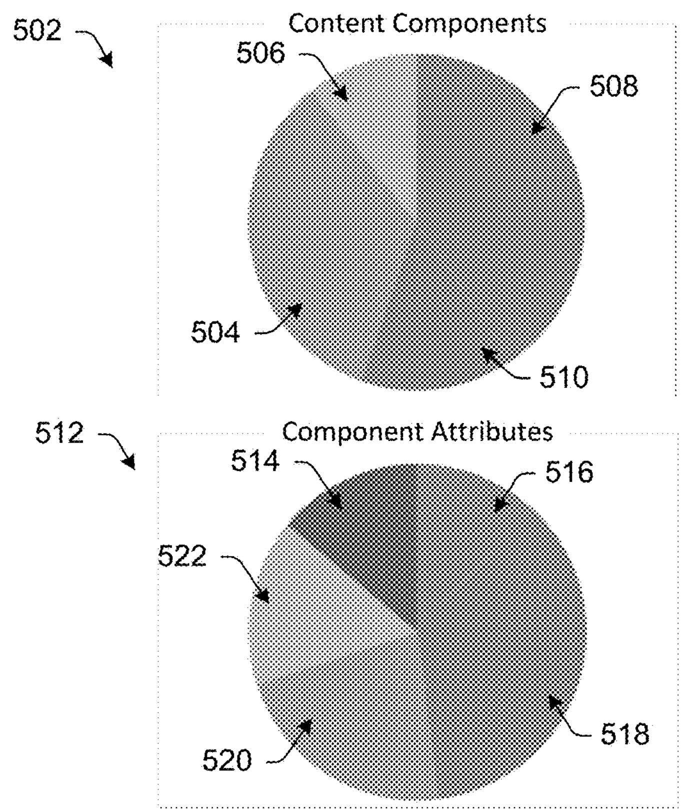

For example, consider FIG. 5, which depicts an example implementation 500 showing effects of different components, and component attributes, on achieving an action by a digital marketing content item. The digital marketing content item 300 of FIG. 3 is shown, with components 302, 304, 306, and 308. In this example, the outcome module 210 has determined a likely effect of the different components 302, 304, 306, and 308 on achieving an action by the digital marketing content item 300. The effect in this example is clicks by users on the digital marketing content item 300, although any likely effect of user interaction may be determined by the outcome module 210, such as conversion, page views, time viewed, "likes" in a social networking application, bounce rate, and so forth.

A first chart 502 is shown with the effects of the different components 302, 304, 306, and 308 on achieving the action by the digital marketing content item 300. A first portion 504 of the chart 502 corresponds to the effect of the digital image component 302; a second portion 506 of the chart corresponds to the effect of the digital image component 304; a third portion 508 of the chart corresponds to the effect of the vector graphic component 306; and a fourth portion 510 of the chart corresponds to the effect of the text box component 308. As shown in the first chart 502 of this example, clicks by users were most affected by the vector graphic component 304 represented by the third portion 508 and largest portion in the first chart.

The effects of the different components 302, 304, 306, and 308 represented by the portions 504, 506, 508, and 510 of the first chart 502 can be measured in a variety of ways. In one example, the outcome module 210 compares the user interaction data 202 for one of the components to user interaction data for a component in a different digital marketing content item that has the same or similar characteristics. If both components that have the same or similar characteristics appearing in two different digital marketing content items had similar outcomes (e.g., both were successful or unsuccessful at achieving an action), then the outcome module 210 can determine that the component had a corresponding effect on the outcome of both digital marketing content items. Additional examples include surveying an audience, assessing which of the components 302, 304, 306, and 308 was clicked on, comments made on different components of the digital marketing content item 300 on social media, keywords used to search for the product or service promoted by the digital marketing content item that relate to the individual components, and so forth.

Additionally, a second chart 512 is shown with the effects of different attributes of one of the components, in this example the vector artwork component 508. Although only one chart is shown in the example implementation 500, the outcome module 210 can determine the effects of attributes of multiple components contained in the digital marketing content item 300. The outcome module 210 can determine the effect of both intrinsic and attached attributes for a single component of the digital marketing content item 300, and discussed above. In this example, the second chart 512 contains effects of attached attributes including a vector artist attribute 514 and a vector application 516 that was used to create the vector artwork 306. The second chart 512 contains effects of intrinsic attributes including a font attribute 518 of the vector artwork, a location attribute 520 of the vector artwork, and a size attribute 522 of the vector artwork. In the current example, the clicks by users were most affected by the font attribute 518 represented by the largest portion in the second chart. The effects of the different attributes of the components can also be measured in a variety of ways, and may be measured in a same or different way than the effects of the different components of the digital marketing content item 300.

Returning to the discussion of FIG. 2, a content recommendation module 212 receives the outcome data 210, and uses the outcome data to generate component recommendations 214 to generate a recommendation to configure at least one subsequent item of digital marketing content based at least in part on the outcome data. The component recommendations 214 are based on the likely effects of the different components on achieving the action by the digital marketing content items. For instance, the content recommendation module 212 can recommend that components that were more successful at producing a particular outcome be used in the digital marketing campaign, such as conversion, click rate, or "likes" on a social media application. Alternatively or additionally, the content recommendation module 212 can recommend that components that were less successful at producing a particular outcome be used in the digital marketing campaign, such as bounce rate or negative comments in reviews of a product or on social media.

The content recommendation module 212 can make similar recommendations for intrinsic attributes and attached attributes of individual components as well. For example, the content recommendation module 212 can recommend a particular color for a dress in a digital image of the digital marketing content item, or recommend a photographer to use for the digital image of the digital marketing content item, based on the success on achieving an outcome by these attributes of the digital image indicated in the outcome data 210.

Figure 6:
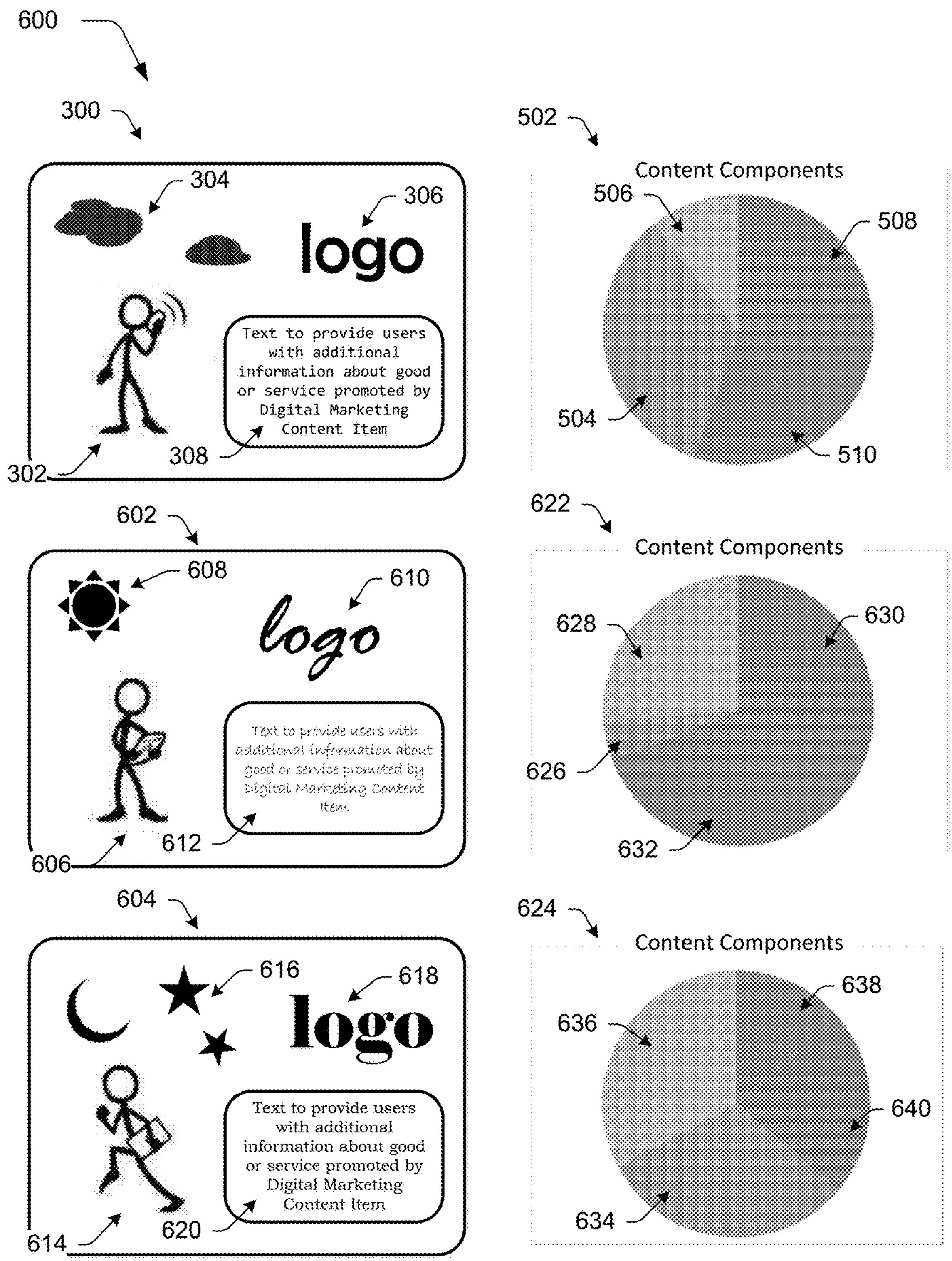
FIG. 6 depicts an example implementation showing effects of components from different digital marketing content items on outcomes of the different digital marketing content items.

As part of the component recommendations 214, the content recommendation module 212 can combine components and/or attributes of components into a combination that the content recommendation module deems to be most likely to be successful in a digital marketing campaign. For example, consider FIG. 6, which depicts an example implementation 600 showing effects of components from different digital marketing content items on achieving an action by the different digital marketing content items. The digital marketing content item 300 is shown again with components 302, 304, 206, and 308, along with the first chart 502 and portions 504, 506, 508, and 510 corresponding to the respective components as described above in relation to FIG. 5.

Also shown are a second digital marketing content item 602 and a third digital marketing content item 604. The second digital marketing content item 602 includes a digital image component 606, a digital image component 608, a vector artwork component 610, and a text box component 612. The third digital marketing content item 604 includes a digital image component 614, a digital image component 616, a vector artwork component 618, and a text box component 620.

Accompanying the second digital marketing content item 602 is a component analysis chart 622, and accompanying the third digital marketing content item 604 is a component analysis chart 624. The component analysis chart 622 includes with the effects of the different components 606, 608, 610, and 612 on the outcome of the digital marketing content item 602. A first portion 626 of the component analysis chart 622 corresponds to the effect of the digital image component 606; a second portion 628 of the chart corresponds to the effect of the digital image component 608; a third portion 630 of the chart corresponds to the effect of the vector graphic component 610; and a fourth portion 632 of the chart corresponds to the effect of the text box component 612. The component analysis chart 624 includes with the effects of the different components 614, 616, 618, and 620 on the outcome of the digital marketing content item 604. A first portion 634 of the component analysis chart 624 corresponds to the effect of the digital image component 614; a second portion 636 of the chart corresponds to the effect of the digital image component 616; a third portion 638 of the chart corresponds to the effect of the vector graphic component 618; and a fourth portion 640 of the chart corresponds to the effect of the text box component 620.

Accordingly, the outcome module 208 can compare the effects of components across different digital marketing content items one to another to determine which components were the most successful at achieving an action. In this example, the outcome module 208 analyzes the effects of the digital images 302, 606, and 614 based on the accompanying portions 506, 628, and 636 to determine which of the different digital images was the most successful at achieving clicks on the different digital marketing content items 300, 602, and 604. The digital image component 614 of the digital marketing content item 604 was the most successful at achieving clicks in this scenario, and therefore the content recommendation module 212 recommends the digital image component 614 for use in a digital marketing campaign based on the outcome data 210 generated by the outcome module 208.

The content recommendation module 212 makes similar recommendations for each of the different components of the digital marketing content items 300, 602, and 604. Based on the charts 502, 622, and 624, the components that were the most successful at producing clicks from the different digital marketing content items are the digital image 636 of the digital marketing content item 604, the vector artwork 306 of the digital marketing content item 300, and the text box 612 of the digital marketing content item 602. Different statistical analyses can be used to compare different components and determine which components were the most successful at producing a particular result across multiple digital content items.

As discussed above, both inherent and attached attributes of each of the components across multiple digital marketing content items can be also analyzed using the same or different techniques to determine attributes that were most successful at achieving an action. The content recommendation module 212 can then make recommendations based on the success of the attributes, such as using a particular font from a first component of a first digital marketing content item, with a color of a second component of a second digital marketing content item, having a size of a third component of a third digital marketing content item. The content recommendation module 212 can include different recommendations in the component recommendations 214 based on the outcome data 210 as to which components had the greatest impact, based on requests for particular recommendations made by a user, and so forth.

Once the most successful components and attributes are determined, the content recommendation module 212 can then combine components and/or attributes that were the most successful at producing a particular result to generate an additional digital marketing content item. The content recommendation module 212 can include the additional digital marketing content item in the component recommendations 214 as an automatically generated digital marketing content item with the most successful components and attributes. The content recommendation module 212 may include more than one automatically generated digital marketing content item in the component recommendations 214, such as combinations of components and attributes that resulted in different successful outcomes, e.g., a first automatically generated digital marketing content item including the components that resulted in the most conversions, a second automatically generated digital marketing content item including the components that resulted in the lowest bounce rate, and so forth.

The content recommendation module 212 outputs the content recommendations 214 and the outcome data 210 to a component output module 216. The component output module 216 outputs the outcome data 210 and/or the component recommendations 214, leveraging the outcome data and the component recommendations in a variety of ways, such as by load balancing of computational resources, targeting of digital marketing content, content search results, and so forth. The outcome data 210 and/or the component recommendations 214 for instance, may be leveraged automatically and without user intervention by the analytics system 106 or output in a user interface 218 by a user interface module 220, e.g., as a notification, in real time during user interaction with the usage data, as a search result input in the user interface, and so forth. Additionally, the outcome data 210 and/or the component recommendations 214 are output to the service manager module 110 of the service provider system 102 to store the effects of the components on the outcome of the digital marketing content items. In this way, a record of the success of the different components can be leveraged by content creators and marketing professionals for future digital marketing campaigns.

By generating and analyzing data for individual components and attributes of components of a digital marketing content item, the analytics system gives marketing teams and content creators the ability to determine success of the digital marketing content item on a piece-by-piece basis. Having access to this information gives marketing teams and content creators an opportunity to deliver the right content to the right audience, at the right time, and through the right channels. In this way, resources are allocated more efficiently during a marketing campaign, as content items can be targeted towards a specific audience based on data for components of a content item, rather than guessing how that audience might respond.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
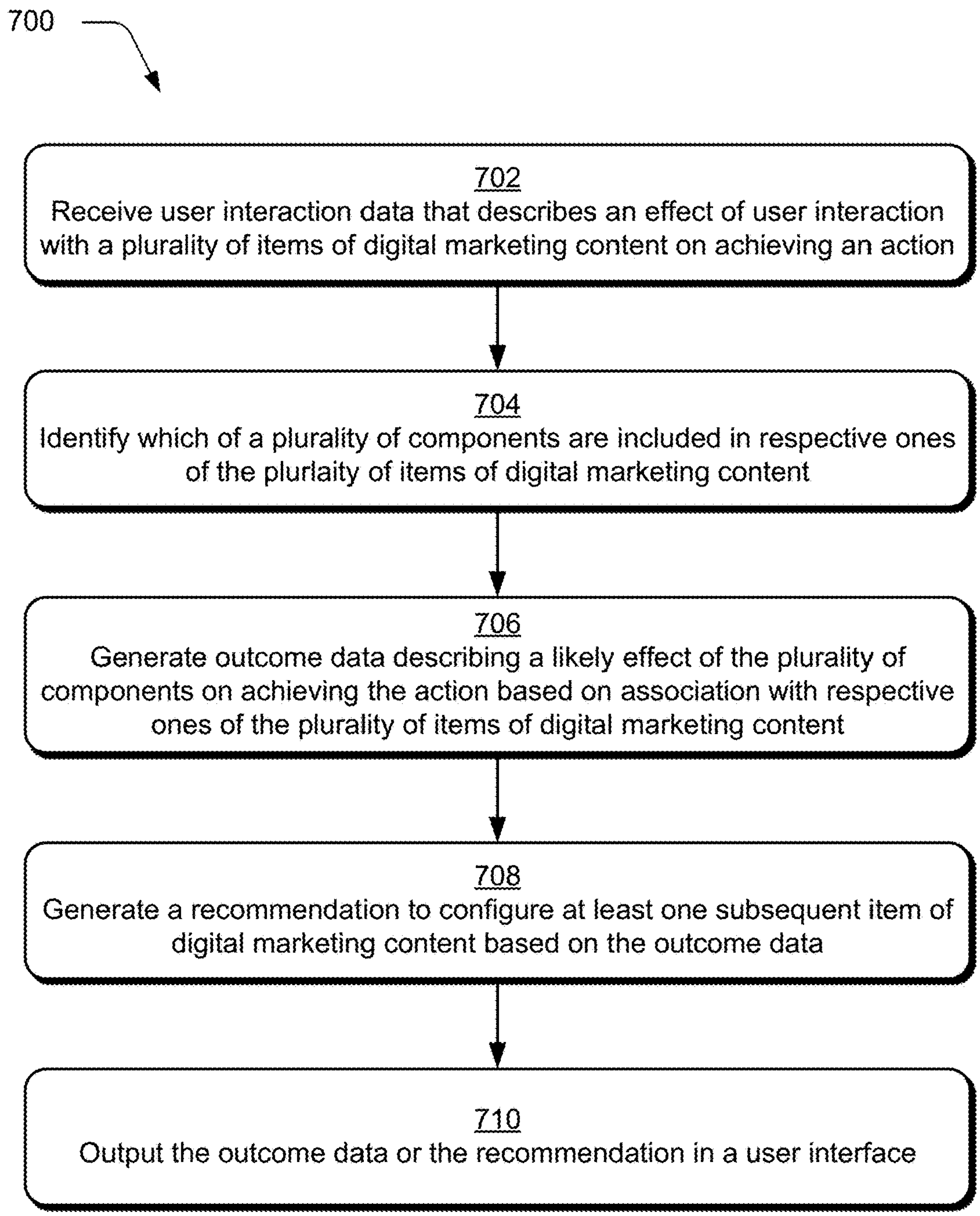
FIG. 7 is a flow diagram depicting a procedure in an example implementation in which components of a digital marketing content item are analyzed in an analytics system.

FIG. 7 depicts a procedure 700 in an example implementation in which a digital marketing content system is optimized to determine an effect of individual components in a digital marketing content item. To begin, user interaction data that describes an effect of user interaction with a plurality of items of digital marketing content on achieving an action is received (block 702). The digital marketing content items may be any form of digital content used in a digital marketing campaign, and are each made up of a plurality of components that may include text, photographs, vector artwork, digital images, 3D objects, haptic output, audio, and/or video. The components in turn may include attributes such as color, size, location in the content item, duration of display, content creator, objects, activities, and so forth. A plurality of components are identified as included in respective ones of the plurality of items of digital marketing content (block 704). The content identification module 204 can identify the plurality of components using a variety of techniques, such as analyzing metadata associated with the digital marketing content item, object recognition techniques for visual content, and/or speech or music recognition for audio content, to name a few examples.

Outcome data is generated describing a likely effect of the plurality of components on achieving the action based on association with respective ones of the plurality of items of digital marketing content (block 706). For example, the outcome module 208 compares the user interaction data 202 between the multiple items of digital marketing content, such as by comparing the user interaction data between components having the same or similar characteristics. If both components that have the same or similar characteristics appearing in two different digital marketing content items had similar outcomes (e.g., both were successful or unsuccessful at achieving the action), then the outcome module 208 determines that both components had a corresponding effect on achieving the action.

The outcome data 210 represents whether components and/or attributes the digital marketing content items were successful, unsuccessful, or had no effect on achieving the action as part of the digital marketing campaign. The outcome module 208, for instance, may take considerations for different audience segments, temporal factors, delivery methods, and so forth when determining the effect of the components on achieving the action. Further, The outcome data 210 may contain various different indications on whether the components were successful or unsuccessful at achieving different actions based on their association with respective items of digital marketing content items, as discussed above.

A recommendation is generated to configure at least one subsequent item of digital marketing content based on the outcome data (block 708). For instance, the content recommendation module 212 can recommend that components that were more successful at achieving an action be used in the digital marketing campaign, such as conversion, click rate, or "likes" on a social media application. Alternatively or additionally, the content recommendation module 212 can recommend that components that were less successful at achieving an action be used in the digital marketing campaign, such as bounce rate or negative comments. The content recommendation module 212 can make similar recommendations for intrinsic attributes and attached attributes of individual components as well.

Further, the content recommendation module 212 can combine components and/or attributes that were the most successful at producing a particular result to generate an additional digital marketing content item having the most successful components and attributes. After generating the recommendation, the outcome data or the recommendation is output to a user interface (block 710). The outcome data and the recommendation may be output together in the user interface, giving a user a complete picture of the recommendation for individual components of digital marketing content items with support for why the recommendation was made.

Example System and Device

Figure 8:
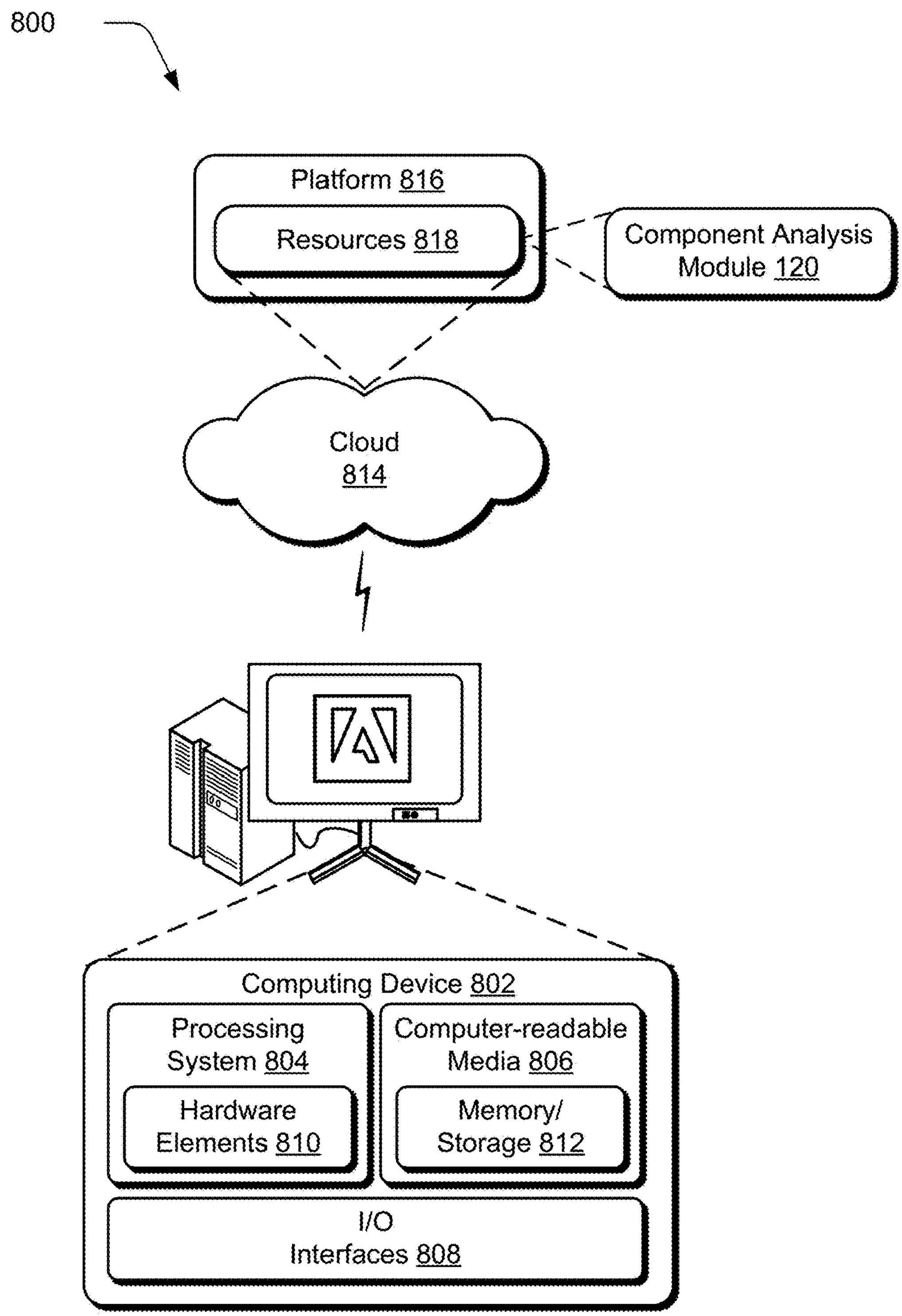
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the component analysis module 120. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to optimize a digital marketing content system, a method implemented by at least one computing device, the method comprising:

receiving, by the at least one computing device, user interaction data that describes an effect of user interaction with a plurality of items of digital marketing content on achieving an action, each item of digital marketing content of the plurality of items of digital marketing content formed, respectively, using at least one component of a plurality of components;

identifying, by the at least one computing device, which of the plurality of components are included in respective ones of the plurality of items of digital marketing content;

generating, by the at least one computing device, outcome data describing a likely effect of respective components of the plurality of components on achieving the action based on association with respective ones of the plurality of items of digital marketing content; and outputting, by the at least one computing device, the outcome data in a user interface.

2. The method as described in claim 1, wherein the identifying, the generating, and the outputting are further performed for a plurality of attributes of at least one of the plurality of components, the plurality of attributes describing characteristics of respective components of the plurality of components.

3. The method as described in claim 2, wherein at least one of the plurality of attributes is an intrinsic attribute that is inherent to the at least one of the plurality of components.

4. The method as described in claim 2, wherein at least one of the plurality of attributes also includes an attached attribute that associates a user or application to the at least one of the plurality of components.

5. The method as described in claim 1, wherein the outcome data represents whether the digital marketing content item was successful, unsuccessful, or had no effect on achieving the action.

6. The method as described in claim 1, wherein the generating further comprises:

assigning the outcome data to multiple of the components of a particular digital marketing content item of the plurality of digital marketing content items; and determining a most effective component within the particular digital marketing content item on achieving the outcome.

7. The method as described in claim 1, wherein the generating further comprises generating the outcome data describing another likely effect of the plurality of components on achieving an additional action based on the association with the respective ones of the plurality of items of digital marketing content.

8. The method as described in claim 1, wherein the generating further comprises comparing the user interaction data for a particular component of the plurality of components to same or similar components of additional digital marketing content items.

9. The method as described in claim 1, further comprising generating a recommendation for one or more of the plurality of components to configure at least one subsequent item of digital marketing content based at least in part on the outcome data.

10. The method as described in claim 9, wherein the generating the recommendation further comprises automatically generating an additional digital marketing content item that includes components having a likely successful effect on achieving the action.

11. In a digital medium environment to optimize content for a digital marketing campaign by a service provider system, a system comprising:

a content identification module implemented at least partially in hardware of a computing device to receive user interaction data that describes an effect of user interaction with a plurality of items of digital marketing content on achieving an action, and identify which of a plurality of components form respective ones of the plurality of items of digital marketing content;

an outcome module implemented at least partially in hardware of the computing device to generate outcome data describing a likely effect of the plurality of components on achieving the action based on association with respective ones of the plurality of items of digital marketing content; and a content recommendation module implemented at least partially in hardware of the computing device to generate a recommendation to configure at least one subsequent item of digital marketing content based at least in part on the outcome data.

12. The system as described in claim 11, wherein the outcome module is further configured to:

assign the outcome data to multiple of the components of a particular digital marketing content item of the plurality of digital marketing content items; and determine a most effective component within the particular digital marketing content item on achieving the outcome.

13. The system as described in claim 11, wherein the outcome module is further configured to generate the outcome data describing another likely effect of the plurality of components on achieving an additional action based on the association with the respective ones of the plurality of items of digital marketing content.

14. The system as described in claim 11, wherein the outcome module is further configured to compare the user interaction data for a particular component of the plurality of components to same or similar components of additional digital marketing content items.

15. The system as described in claim 11, wherein the content recommendation module is further configured to automatically generate an additional digital marketing content item that includes components having a determined successful effect on achieving the action.

16. The system as described in claim 11, wherein the content recommendation module is further configured to automatically generate multiple additional digital marketing content items that each include components having different determined successful effects on achieving the action.

17. In a digital medium environment to optimize content for a digital marketing campaign by a service provider system, a system comprising:

means for receiving user interaction data that describes an effect of user interaction with a plurality of items of digital marketing content on achieving an action, in which:

each item of digital marketing content of the plurality of items of digital marketing content formed, respectively, using at least one component of a plurality of components; and each of the plurality of components has a respective attribute of a plurality of attributes that defines the component;

means for identifying which of the plurality of components and the plurality of attributes of at least one of the plurality of components are included in respective ones of the plurality of items of digital marketing content;

means for generating outcome data describing a likely effect of the plurality of components and the attributes of the at least one of the plurality of components on achieving the action based on association with respective ones of the plurality of items of digital marketing content; and means for outputting the outcome data.

18. The system as described in claim 17, wherein at least one of the attributes is an intrinsic attribute that is inherent to the at least one of the plurality of components.

19. The system as described in claim 17, wherein at least one of the attributes includes an attached attribute that associates a user or application to the at least one of the plurality of components.

20. The system as described in claim 17, wherein the means for determining is further configured to compare the user interaction data for a particular component of the plurality of components or a particular attribute to same or similar components or attributes of additional digital marketing content items.

* * * * *